US009536477B2

(12) United States Patent
Sako et al.

(10) Patent No.: US 9,536,477 B2
(45) Date of Patent: Jan. 3, 2017

(54) DISPLAY CONTROL DEVICE AND RECORDING MEDIUM

(71) Applicant: Sony Corporation, Tokyo (JP)

(72) Inventors: Yoichiro Sako, Tokyo (JP); Etsuko Nakamura, Gifu (JP); Tsuyoshi Ito, Gifu (JP); Hitoshi Kubota, Nagano (JP); Tsuyoshi Nagata, Tokyo (JP); Akira Tange, Tokyo (JP); Masashi Takeda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 59 days.

(21) Appl. No.: 14/085,111

(22) Filed: Nov. 20, 2013

(65) Prior Publication Data

US 2014/0146093 A1    May 29, 2014

(30) Foreign Application Priority Data

Nov. 27, 2012    (JP) .................... 2012-258580

(51) Int. Cl.
  *G09G 3/34*    (2006.01)
  *H04W 52/02*    (2009.01)
  *G02F 1/1335*    (2006.01)
  *G09G 3/32*    (2016.01)
  *H04M 1/725*    (2006.01)

(52) U.S. Cl.
  CPC ....... *G09G 3/3406* (2013.01); *G02F 1/133555* (2013.01); *H04W 52/027* (2013.01); *G09G 3/32* (2013.01); *G09G 3/34* (2013.01); *G09G 2360/144* (2013.01); *H04M 1/72522* (2013.01); *H04M 1/72544* (2013.01); *H04M 2250/52* (2013.01)

(58) Field of Classification Search
  CPC .......... G09G 3/19; G09G 3/3433; G09G 3/38; G09G 2360/144; G09G 3/32; G09G 3/34; G09G 3/3406; G02F 1/133555; H04M 1/72522; H04M 1/72544; H04M 2250/52; H04W 52/027
  USPC ........ 3/87–102, 204–214, 690–699; 455/566
  See application file for complete search history.

(56) References Cited

U.S. PATENT DOCUMENTS

| 6,311,077 | B1* | 10/2001 | Bien ............................ 455/566 |
| 7,555,141 | B2* | 6/2009 | Mori ..................... H04N 7/142 348/14.01 |
| 7,948,481 | B2* | 5/2011 | Vilcovsky ............... G02B 5/08 345/204 |
| 2002/0167511 | A1* | 11/2002 | Kim et al. .................... 345/211 |
| 2003/0125080 | A1* | 7/2003 | Shimamura ......... H04M 1/0214 455/556.1 |
| 2004/0082367 | A1* | 4/2004 | Nakanishi et al. ........... 455/566 |
| 2004/0100598 | A1* | 5/2004 | Adachi et al. ................ 349/113 |
| 2005/0057437 | A1* | 3/2005 | Sato ................................. 345/4 |
| 2006/0094479 | A1* | 5/2006 | Napier-Clark ............ 455/575.1 |

(Continued)

FOREIGN PATENT DOCUMENTS

| JP | 2004-258400 A | 9/2004 |
| JP | 2005-321635 A | 11/2005 |

*Primary Examiner* — Dmitriy Bolotin
(74) *Attorney, Agent, or Firm* — Chip Law Group

(57) ABSTRACT

There is provided a display control device including a determination unit configured to determine a type of input information, and a display controller configured to switch modes of a display unit capable of being switched to a mirror surface mode and a display mode in accordance with a result of determination by the determination unit.

15 Claims, 8 Drawing Sheets

(56) References Cited

U.S. PATENT DOCUMENTS

| | | | |
|---|---|---|---|
| 2006/0105814 A1* | 5/2006 | Monden | H04M 1/72519 |
| | | | 455/566 |
| 2006/0202942 A1* | 9/2006 | Fong | 345/102 |
| 2006/0209012 A1* | 9/2006 | Hagood, IV | 345/109 |
| 2006/0221206 A1* | 10/2006 | Lin et al. | 348/227.1 |
| 2007/0066247 A1* | 3/2007 | Mooney | 455/90.3 |
| 2007/0295588 A1* | 12/2007 | Kamata | 200/341 |
| 2008/0030644 A1* | 2/2008 | Ukawa et al. | 349/61 |
| 2008/0252833 A1* | 10/2008 | Nieuwkerk et al. | 349/115 |
| 2009/0061913 A1* | 3/2009 | Woodruff | 455/466 |
| 2010/0201816 A1* | 8/2010 | Lee et al. | 348/148 |
| 2010/0279740 A1* | 11/2010 | Lee et al. | 455/566 |
| 2011/0140996 A1* | 6/2011 | Parry-Jones | G02B 26/005 |
| | | | 345/60 |
| 2012/0162238 A1* | 6/2012 | Fleck et al. | 345/545 |

* cited by examiner

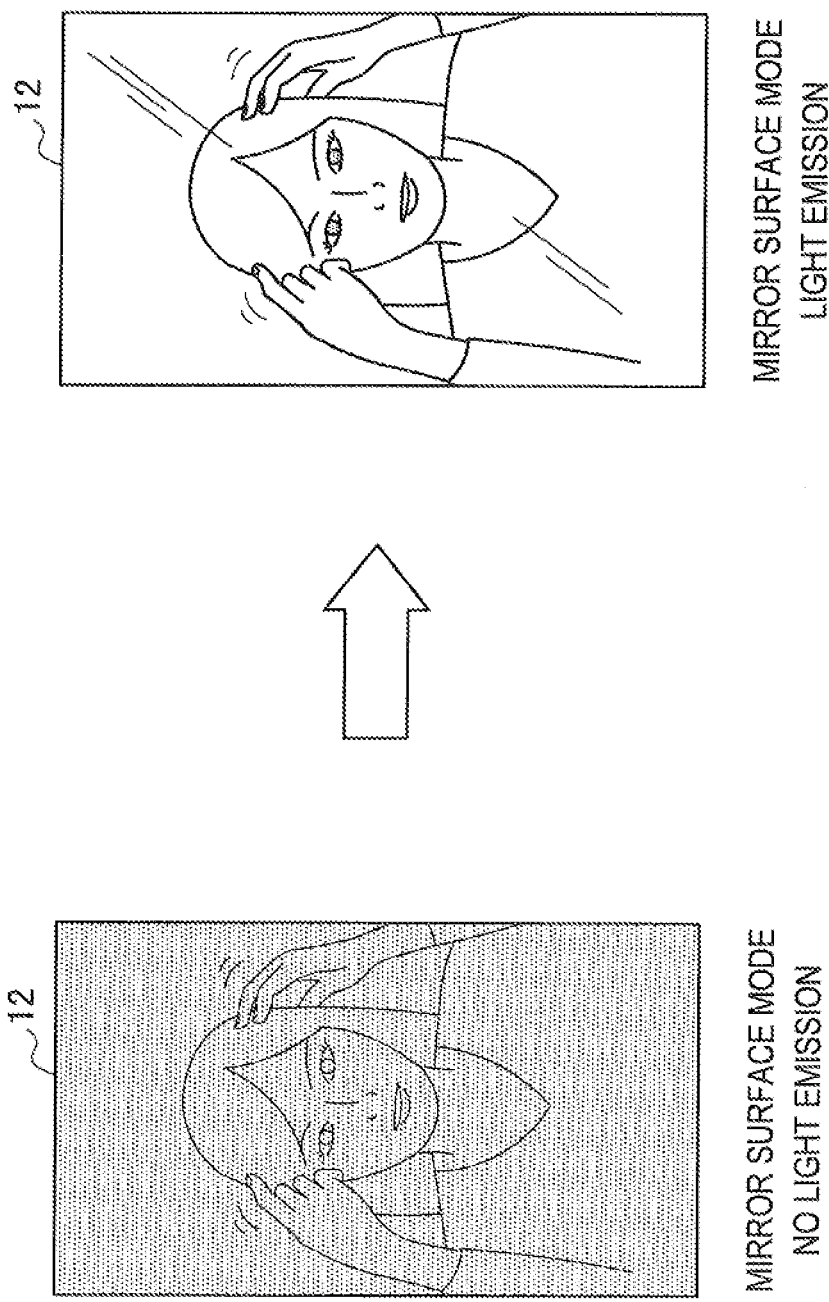

DISPLAY CONTROL DEVICE AND RECORDING MEDIUM

CROSS REFERENCE TO RELATED APPLICATIONS

This application claims the benefit of Japanese Priority Patent Application JP 2012-258580 filed Nov. 27, 2012, the entire contents of which are incorporated herein by reference.

BACKGROUND

The present disclosure relates to a display control device and a recording medium.

In recent years, mobile communication terminals, such as mobile phone terminals, smartphones, and tablet terminals, have become common. In particular, mobile phone terminals and smartphones have camera functions, operation input functions with a touch panel, and the like, in addition to a communication function using a phone and mail. Further, recently, some display screens of mobile phone terminals and smartphones are provided with a mirror surface function.

Techniques of using a display screen as a mirror surface are proposed in JP 2004-258400A and JP 2005-321635A, for example.

JP 2004-258400A discloses, as an application of a dimming mirror, a technique in which the dimming mirror adhered to an information display medium is used by switching states between a mirror surface state and a transparent state.

Further, JP 2005-321635A discloses a technique for preventing uncomfortable feeling from being generated due to the mirror surface state when the power is off in a display device which is used by switching states between the mirror surface state and the transparent state. Specifically, dimming glass is adhered to a front surface of a mirror surface film and the transmittance of the dimming glass is controlled, so that the mirror surface state is controlled when the power is off.

SUMMARY

However, none of JP 2004-258400A and JP 2005-321635A refers to automatically switching of a mirror surface portion on the display to the mirror surface state (mirror surface mode) or the transparent state (display mode) in accordance with conditions such as the type of information input to the display.

Thus, the present disclosure proposes a novel and improved display control device and recording medium in which modes can be switched between the mirror surface mode and the display mode in accordance with conditions.

According to an embodiment of the present disclosure, there is provided a display control device including a determination unit configured to determine a type of input information, and a display controller configured to switch modes of a display unit capable of being switched to a mirror surface mode and a display mode in accordance with a result of determination by the determination unit.

According to another embodiment of the present disclosure, there is provided a recording medium having a program stored therein, the program for causing a computer to function as a determination unit configured to determine a type of input information, and a display controller configured to switch modes of a display unit capable of being switched to a mirror surface mode and a display mode in accordance with a result of determination by the determination unit.

As described above, according to one or more of embodiments of the present disclosure, it is possible to switch modes between the mirror surface mode and the display mode in accordance with conditions.

BRIEF DESCRIPTION OF THE DRAWINGS

FIG. 8 is a view for describing a case where effects of a mirror surface function are increased by light emission in a mirror surface mode.

DETAILED DESCRIPTION OF THE EMBODIMENT(S)

Figure 1:
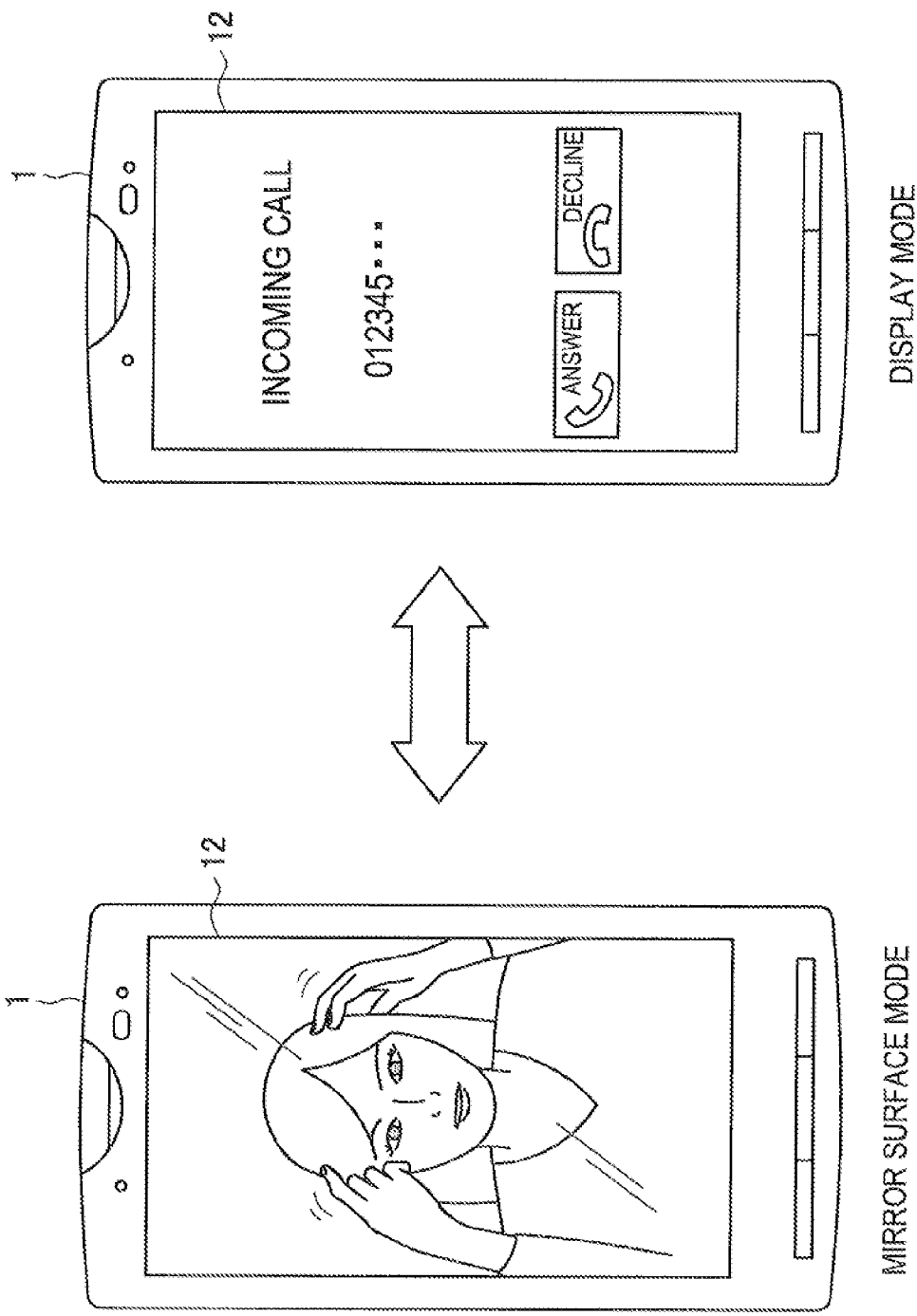
FIG. 1 is a view for describing a summary of a display control system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, a description will be made in the following order.
1. Summary of a display control system according to an embodiment of the present disclosure
2. Configuration of a communication terminal
3. Operation processing
3-1. First operation processing
3-2. Second operation processing
4. Conclusion

1. Summary of a Display Control System According to an Embodiment of the Present Disclosure First, a summary of a display control system according to an embodiment of the present disclosure will be described with reference to FIG. 1.

FIG. 1 is a view for describing the summary of the display control system according to an embodiment of the present disclosure. As shown in FIG. 1, the display control system is applied to a communication terminal 1 (display control device), and controls switching of modes between a mirror surface mode and a display mode of a display unit 12 provided in the communication terminal 1.

In the mirror surface mode, as shown in the left in FIG. 1, a mirror image is reflected in the display unit 12, so that a user can use the display unit 12 as a mirror.

Here, in general, when a display unit of a communication terminal is used as a mirror surface, a semi-transmitting polarizing plate or a half mirror, which functions as the mirror surface when the power is off (back light is off), is provided on a liquid crystal display unit. Therefore, when the power is off, external light is reflected and mirror surface effects are generated, and when the power is on (back light is on), light from the liquid crystal display unit passes through the polarizing plate or the half mirror, and accordingly, the user can visually recognize content displayed on the liquid crystal display unit.

However, convenience is not good in that the mirror surface state is forced to end when the power of the communication terminal is automatically turned on in a case of mail reception, an incoming call, an alarm time, or a time for television viewing reservation, for example, even when the user intends to continue using the mirror surface.

Thus, focusing on the above-described circumstance, the display control system (display control device) according to each embodiment of the present disclosure has been created. The display control system according to each embodiment of the present disclosure can determine the type of input information and switch modes between the mirror surface mode and the display mode in accordance with determination results. For example, when the display unit 12 is in the mirror surface mode and there is an incoming call, since an incoming call is highly possibly more urgent than mail reception, the mode is switched to the display mode is set; when there is mail reception, the mirror surface mode is maintained. Thus, the communication terminal 1 can be more convenient.

The summary of the display control system according to an embodiment of the present disclosure is described above. Next, a configuration of the communication terminal 1 to which the display control system according to the embodiment is applied and operation processing of the display control system will be described in that order. Note that the example in FIG. 1 shows a smartphone as an example of the communication terminal 1; however, the communication terminal 1 according to the embodiment may be, without limitation thereto, a mobile phone, a PHS (personal handyphone system), a tablet terminal, PDA (personal digital assistant), a laptop PC (personal computer), a game machine, a wearable device, or the like.

2. Configuration of a Communication Terminal

[2-1. Internal Configuration]

Figure 2:
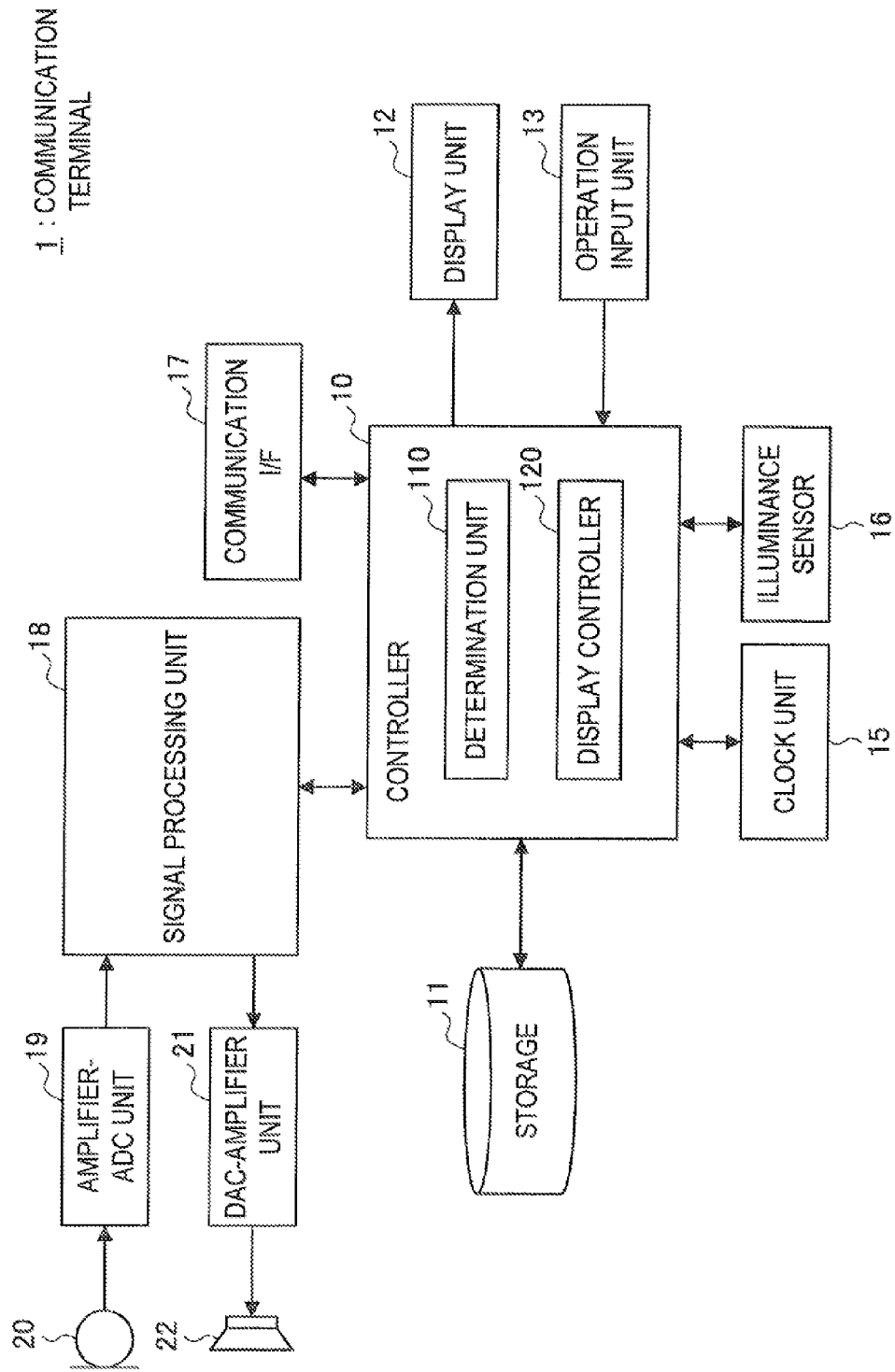
FIG. 2 is a block diagram showing an example of an internal configuration of a communication terminal according to the embodiment.

FIG. 2 is a block diagram showing an example of an internal configuration of the communication terminal 1 according to the embodiment. As shown in FIG. 2, the communication terminal 1 according to the embodiment includes a controller 10, a storage 11, a display unit 12, an operation input unit 13, a clock unit 15, an illuminance sensor 16, a communication I/F (interface) 17, a signal processing unit 18, an amplifier-ADC (analog-digital converter) unit 19, a microphone 20 (hereinafter referred to as mike 20), a DAC (digital-analog converter)-amplifier unit 21, and a speaker 22.

(Controller)

The controller 10 has a function of controlling each component of the communication terminal 1. For example, the controller 10 controls each component in accordance with user's operation input through the operation input unit 13. Further, as shown in FIG. 2, the controller 10 according to the embodiment functions as the determination unit 110 and the display controller 120.

The determination unit 110 determines the type of information (content) input to the determination unit 110. The information input to the determination unit 110 is information to be displayed on the display unit 12 by the display controller 120, and examples of such a type of information include an incoming call, mail reception, photo/image information, alarm/TV viewing reservation notification, and the like. The determination unit 110 outputs determination results to the display controller 120.

The display controller 120 controls the display unit 12 and allows predetermined information, such as a menu screen or various operation screens, to be displayed. Further, the display controller 120 according to the embodiment controls switching of modes of the display unit 12 capable of being switched to the display mode and the mirror surface mode. Specifically, the display controller 120 switches the display unit 12 to the mirror surface mode or the display mode in accordance with the determination results of the type of input information, which are determined by the determination unit 110. For example, when the type of input information determined by the determination unit 110 gives priority to the mirror surface mode, the display controller 120 switches the display unit 12 to the mirror surface mode, and when the type of input information determined by the determination unit 110 gives priority to the display mode, the display controller 120 switches the display unit 12 to the display mode.

As for the priority of modes in accordance with the type of input information, for example, in cases of an incoming video call, a normal incoming call, mail reception, and image reproduction, the display controller 120 gives priority to the mirror surface mode, the display mode, the mirror surface mode, and the display mode, respectively. Note that in the case of image reproduction, the user can set in advance the priority of programs which are highly worth viewing or in which the user can live-participate, such as the Olympics or online games, so that the display modes can have priority. Further, in the case of the incoming video call, a user's image is to be captured with an in-camera (not shown) provided in the communication terminal 1 to be transmitted to a communicating party; accordingly, the user might want to see him/herself before the video communication starts, and the mirror surface mode has priority.

The above-described priority on the mirror surface mode in accordance with the type of input information can make the communication terminal 1 more convenient because switching to the display mode is not forced even when there is input information displayed on the display unit 12 during the use of the mirror surface.

Further, the display controller 120 according to the embodiment can make the communication terminal 1 even more convenient by controlling light emission of light-emitting elements which are not included in the mirror surface portion of the display unit 12 in accordance with context when the display unit 12 is in the mirror surface mode. The context is a current time or an illuminance of ambient environment. When the current time is predetermined nighttime or when the illuminance of ambient environment is lower than a predetermined value, it can be determined that the ambient environment is dark, so that the display controller 120 allows the light-emitting elements which are not included in the mirror surface portion of the display unit 12 to emit light. Thus, the mirror surface can be easily seen even when the ambient environment is dark.

(Display Unit)

The display unit 12 displays a menu screen, various operation screens, or the like in accordance with the control by the controller 10. Further, the display unit 12 has the display mode and the mirror surface mode, and is switched to the display mode or the mirror surface mode in accordance with the control by the controller 10. Specifically, the display unit 12 is formed using a material capable of switching states between a mirror surface state and a transparent state. A specific structure of the display unit 12 formed using such a material will be described later with reference to FIG. 3.

(Operation Input Unit)

The operation input unit 13 detects an operation input by the user. The operation input unit 13 may be achieved with various buttons physically provided on the communication terminal 1 or with a touch panel which detects the position of touch by the user on the screen of the display unit 12.

(Clock Unit)

The clock unit 15 has functions of keeping time and outputting current time information to the controller 10. Further, the clock unit 15 may be achieved by an internal clock.

(Illuminance Sensor)

The illuminance sensor 16 is a detection unit which detects the illuminance of ambient environment and outputs the detected value of the illuminance to the controller 10. Further, the illuminance sensor 16 may be achieved by a photodiode (photodiode sensitive to visible light).

(Mike)

The mike 20 collects the user's voice and outputs voice information (audio signal) corresponding to the user's voice to the amplifier-ADC unit 19.

(Amplifier-ADC Unit)

The amplifier-ADC unit 19 has an amplifier which amplifies the voice information output from the mike 20 and an ADC which converts an analog electric signal of the voice information amplified by the amplifier to a digital electric signal. Further, the amplifier-ADC unit 19 outputs the voice information converted to the digital electric signal to the signal processing unit 18.

(DAC-Amplifier Unit)

The DAC-amplifier unit 21 has a DAC which converts a digital electric signal of voice information of the communicating party, which is output from the signal processing unit 18, to an analog electric signal, and an amplifier which amplifies the voice information converted to the analog electric signal. Further, the DAC-amplifier unit 21 outputs the voice information which is converted to the analog electric signal and is amplified to the speaker 22. Note that the voice information output from the signal processing unit 18 is not limited to the voice (reception voice) of the communicating party and may be an audio signal of various content (e.g., movie, TV program, or music) to be reproduced in the display unit 12.

(Speaker)

The speaker 22 has a function of outputting (reproducing) the voice information output from the DAC-amplifier unit 21.

(Signal Processing Unit)

The signal processing unit 18 has a function of performing predetermined signal processing on transmission voice which is collected by the mike 20 to be output from the amplifier-ADC unit 19 or reception voice received by the communication I/F 17 in accordance with the control by the controller 10. For example, the signal processing unit 18 performs volume change, noise cancellation, encoding, decoding, treatment, and the like.

(Storage)

The storage 11 stores programs for executing various controls by the controller 10 and the like.

(Communication I/F)

The communication I/F 17 has a function of transmitting and receiving data to/from an external device. Specifically, the communication I/F 17 can be connected to a mobile phone network, a telephone line, or Internet connection, and receives an incoming call, an incoming video call, mail, and the like.

[2-2. Structure of a Display Unit]

The internal configuration of the communication terminal 1 according to the embodiment is specifically described above. Next, a specific structure of the display unit 12 of the communication terminal 1 according to the embodiment will be described with reference to FIG. 3.

Figure 3:
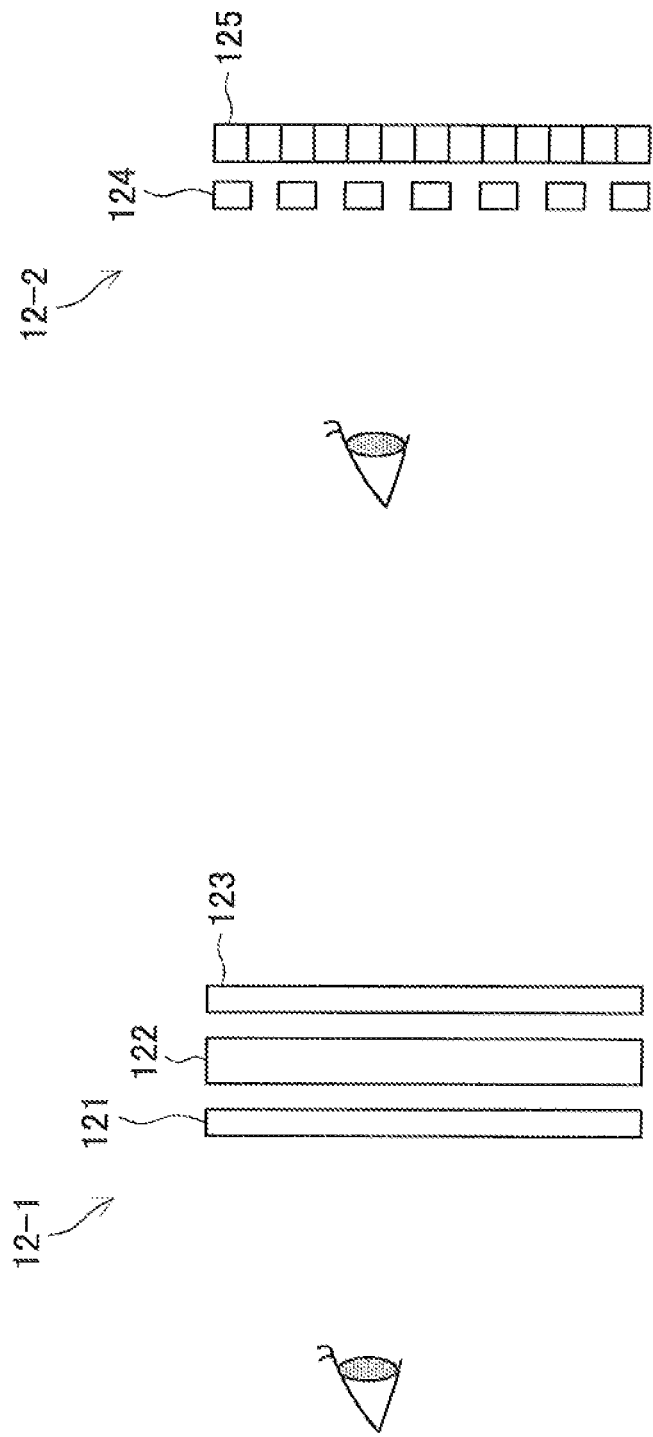
FIG. 3 is a view for describing a structural example of a display unit according to the embodiment.

FIG. 3 is a view for describing a structural example of the display unit 12 according to the embodiment. The display unit 12 according to the embodiment may be a display unit 12-1 including a dimming mirror 121, a liquid crystal panel 122, and a backlight 123, as shown in the left of FIG. 3. The liquid crystal panel 122 has a function of displaying input information in accordance with the control by the display controller 120. Further, behind the liquid crystal panel 122, the backlight 123 is provided as a light source. The backlight 123 emits light when information is displayed on the liquid crystal panel 122 and illuminates the transmission-type liquid crystal panel 122 from the back side thereof. Note that a combination of such a transmission-type liquid crystal panel 122 and a backlight is also referred to as liquid crystal module.

In front of the liquid crystal panel 122, the dimming mirror 121 is provided. The dimming mirror 121 is formed using an electro chromic material which generates chromism with an electric switch and is switched to the mirror surface state and the transparent state. When the dimming mirror 121 is in the transparent state, the user can visually recognize information displayed on the liquid crystal panel 122; therefore, here, a case where the dimming mirror 121 is in the transparent state is referred to as display mode and a case where the dimming mirror 121 is in the mirror surface state is referred to as mirror surface mode.

There are a variety of specific materials for the dimming mirror 121, an example of which being a combination of an electrolyte layer with a magnesium-nickel-based alloy thin film. In this case, a property of magnesium whose composition can reversibly be changed to magnesium hydride and whose transparency is increased when becoming magnesium hydride is used for the dimming mirror 121. Besides, the dimming mirror 121 may also be formed using the magnesium-titanium alloy thin film disclosed in JP 2008-20586A or the magnesium-niobium alloy thin film disclosed in JP 2008-20590A.

Further, the display unit 12 according to the embodiment may be a display unit 12-2 formed using a mirror surface filter 124 and organic EL (electroluminescence) 125, as shown in the right of FIG. 3. The organic EL 125 has a function of displaying input information in accordance with the control by the display controller 120. Note that the organic EL 125 is one of examples of an image element, and the image element according to the embodiment is not limited to the organic EL and may be, for example, an LED (light emitting diode) or an LCD (liquid crystal display).

Further, as shown in FIG. 3, in front of the organic EL 125, the mirror surface filter 124 is provided. The mirror surface filter 124 is formed using a metal evaporation film of aluminum, silver, or the like, and may be metal-evaporated in each pixel unit of the organic EL 125. The mirror surface filter 124 functions as a mirror surface in a manner that, when the organic EL 125 is OFF (no light emission) or emits black light, the user visually recognizes reflected light of external light reflected by the mirror surface filter 124. Here, a case where the mirror surface filter 124 functions as the mirror surface when the organic EL 125 is OFF is referred to as mirror surface mode and a case where the organic EL 125 is ON is referred to as display mode.

The two examples are described above as specific structures of the display unit 12 with reference to FIG. 3; however, the display unit 12 according to the embodiment may alternatively have a structure in which a half mirror is provided instead of the dimming mirror 121 included in the display unit 12-1.

Further, a mirror surface portion including the dimming mirror 121, the mirror surface filter 124, and the like may be provided over the entire surface of a display module such as the liquid crystal panel 122 or the organic EL 125, or may be provided over a part thereof.

3. Operation Processing

Next, operation processing of the display control system according to the embodiment will be specifically described with reference to FIGS. 4 to 8.

[3-1. First Operation Processing]

Figure 4:
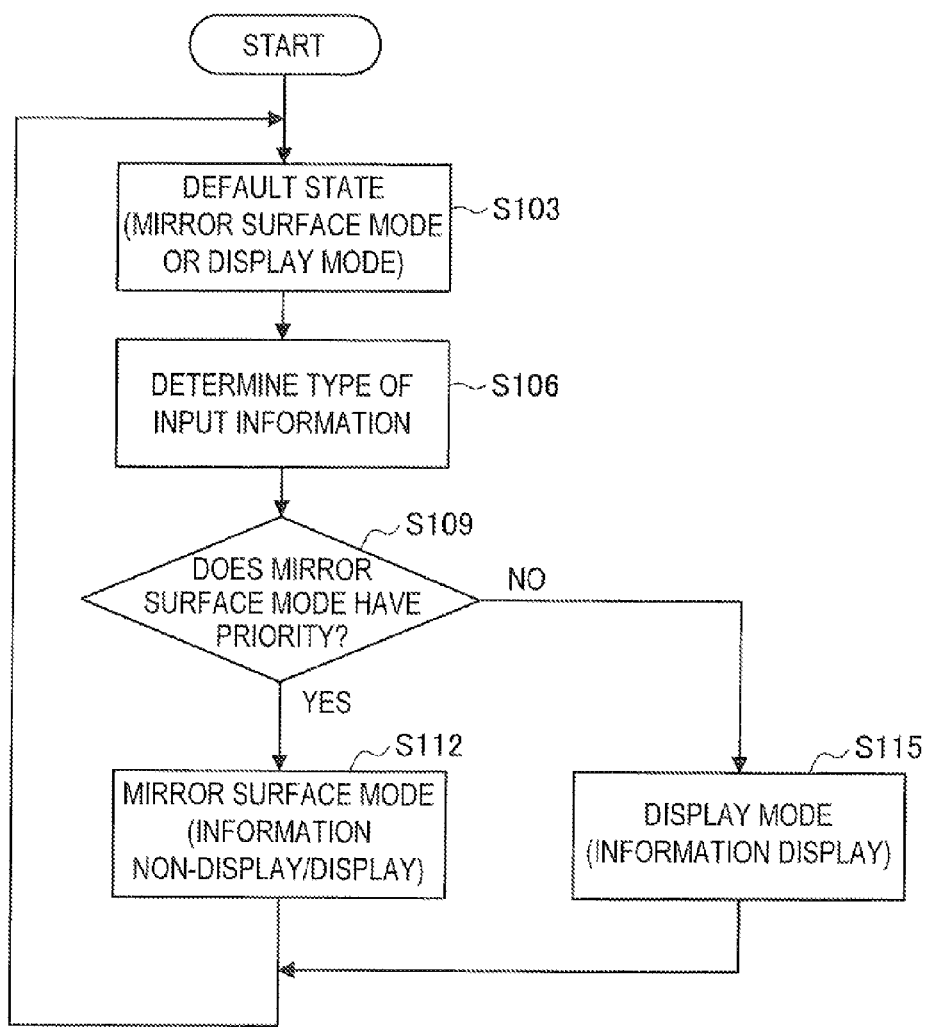
FIG. 4 is a flow chart showing first display control processing according to the embodiment.

FIG. 4 is a flow chart showing first display control processing according to the embodiment. As shown in FIG. 4, first, in step S103, the display unit 12 is in the mirror surface mode or the display mode as a default state. It may be set in advance by the user whether the default state is the mirror surface mode or whether the default state is the display mode; alternatively, a mode that has been switched to last time may be maintained.

Note that when using the dimming mirror 121, the mirror surface state and the transparent state of the dimming mirror 121 are switched reversibly by switching an electric switch; however, the switching speed might be slow depending on a material used for the dimming mirror 121. Thus, the communication terminal 1 according to the embodiment sets the mirror surface mode as the default state and when information display is finished, the display mode is automatically switched to the mirror surface mode; therefore, in need of a mirror the user can immediately use the display unit 12 as a mirror, so that the convenience is increased.

Further, the default state may be set to the mirror surface mode or the display mode depending on hours. For example, since the display unit 12 is highly possibly used as a mirror in morning hours (e.g., six to eight o'clock), the default state of the communication terminal 1 may be set to the mirror surface mode.

Next, in step S106, the determination unit 110 of the controller 10 determines the type of input information.

Then, in step S109, the display controller 120 determines whether or not the mirror surface mode has priority based on results of determination by the determination unit 110.

Next, when it is determined that the mirror surface mode has priority (S109/Yes), in step S112, the display controller 120 switches the display unit 12 to the mirror surface mode. Thus, when the default state is the mirror surface mode, that state is maintained, and when the default state is the display mode, the display mode is switched to the mirror surface mode.

For example, when the input information is mail notification, the urgency is assumed to be low, so that the display controller 120 gives priority to the mirror surface mode over information display (display mode) on the display unit 12. Further, since the mail notification or alarm notification is possible not only by display but also by sound or vibration, the controller 10 may give the notification by a method other than display so that the display unit 12 can maintain the mirror surface mode.

Further, when the input information is an incoming video call, since the user's image captured with an in-camera (not shown) of the communication terminal 1 is to be transmitted to the communicating party, the user might want to use a mirror before the communication starts. Accordingly, when the input information is an incoming video call, the display controller 120 may temporarily switch the display unit 12 to the mirror surface mode and then switch the mirror surface mode to the display mode.

Further, when the entire display unit 12 is switched to the mirror surface mode, information to the display unit 12 is not displayed; however, the display controller 120 may switch a part of the display unit 12 to the mirror surface mode and information may be displayed on the other part of the display unit 12. Such a case will be specifically described below with reference to FIGS. 5 and 6.

Figure 5:
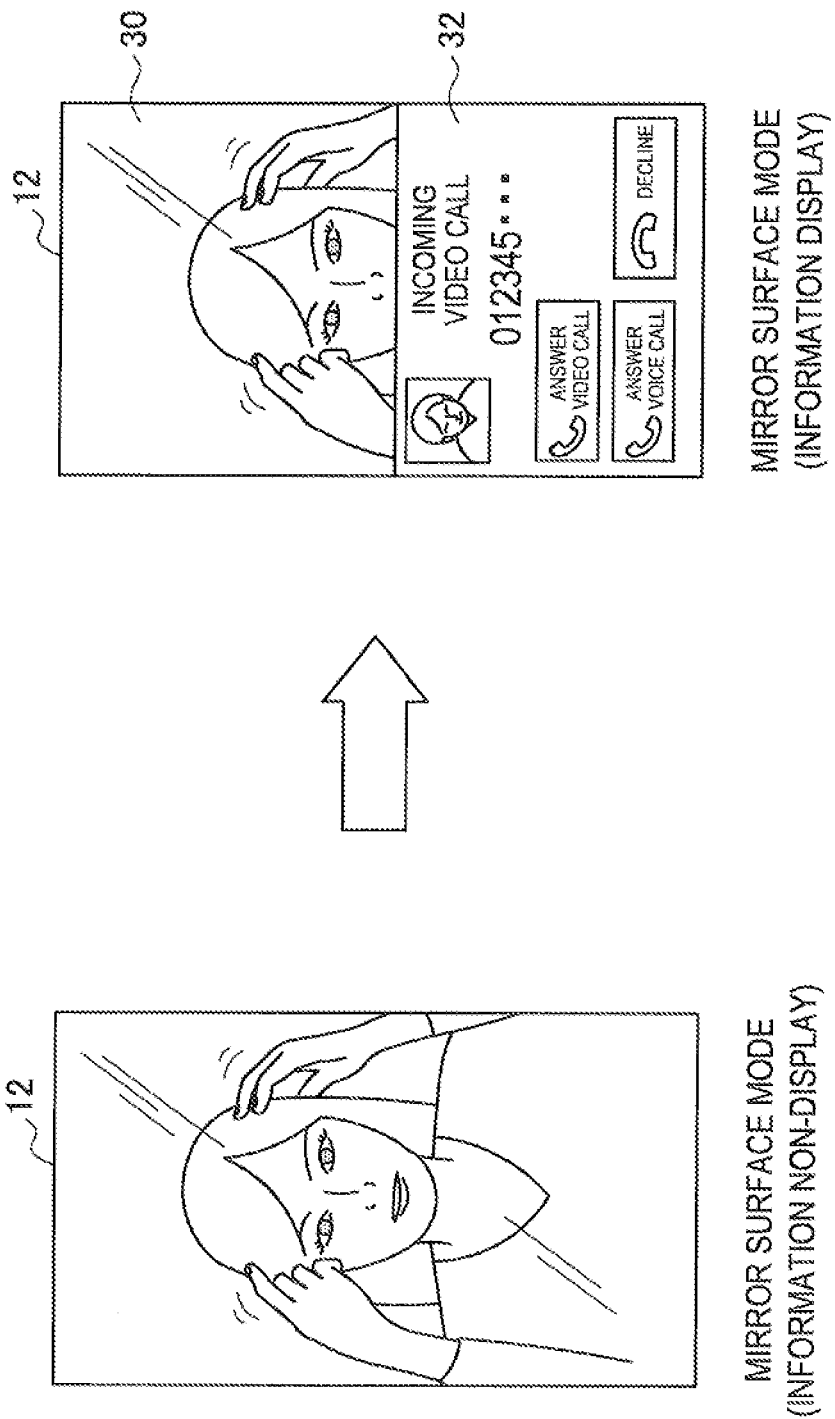
FIG. 5 is a view for describing a case where information is displayed on a part of a display unit in a mirror surface mode.

FIG. 5 is a view for describing a case where information is displayed on a part of the display unit 12 in the mirror surface mode. As shown in the left of FIG. 5, when the entire display unit 12 is switched to the mirror surface mode, information is not displayed. On the other hand, as shown in the right of FIG. 5, the display controller 120 may allow a region 30 which is a part of the display unit 12 to function as the mirror surface and switch a region 32 which is the other region to the display mode so that information is displayed.

For example, in a case of the display unit 12-2 shown in FIG. 3, the part of the display unit 12 can display information by the control of the display controller 120 such that a group of pixels arranged in a region among all the pixels of the organic EL 125 performs display. Further, in a case where the display unit 12-1 shown in FIG. 3 is used and the dimming mirror 121 is provided over a part of the liquid crystal panel 122, a part of the display unit 12 can display information by the control of the display controller 120 such that display is performed in a region where the dimming mirror 121 is not provided.

Figure 6:
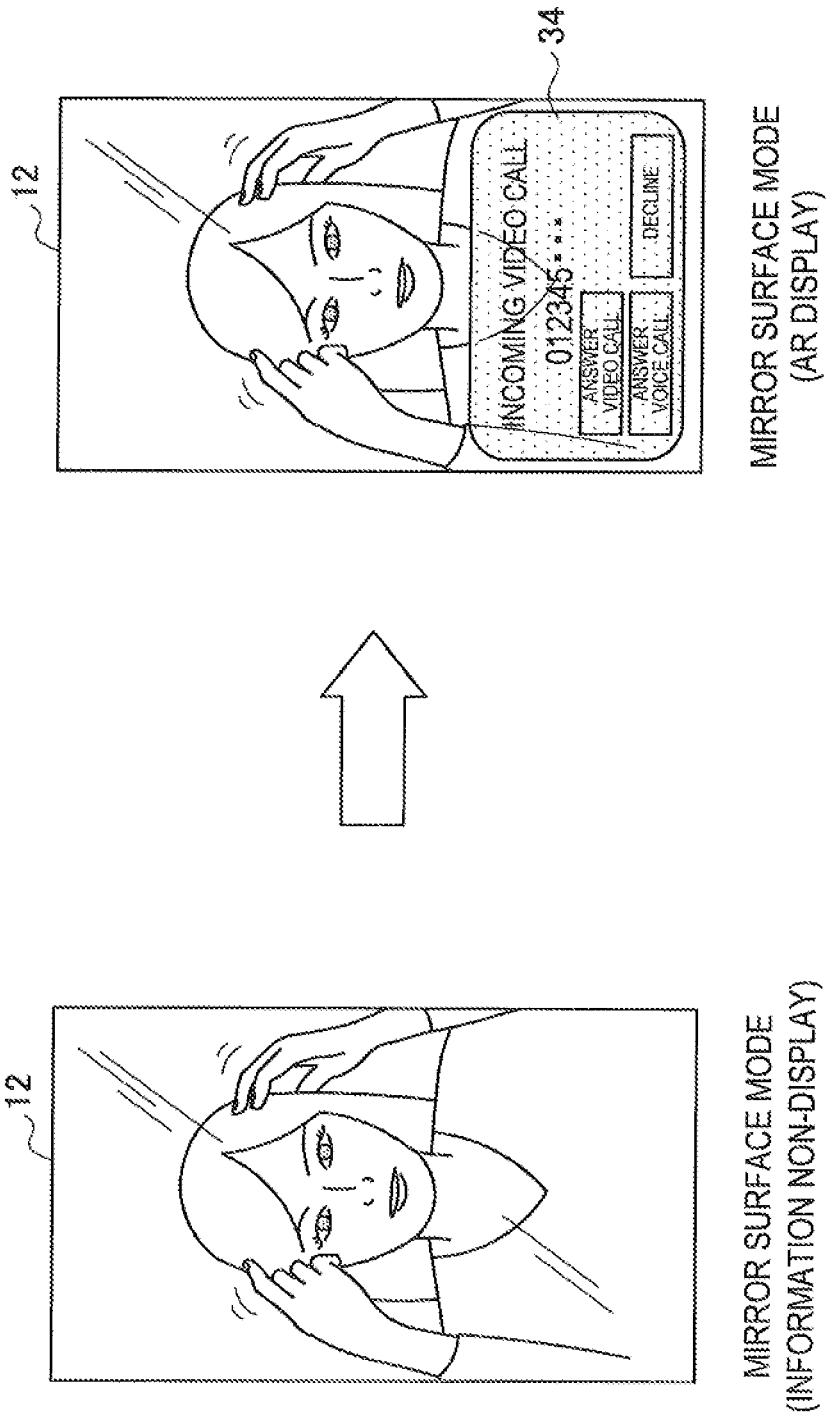
FIG. 6 is a view for describing a case where AR display is performed in a mirror surface mode.

FIG. 6 is a view for describing a case where AR display is performed in the mirror surface mode. As shown in the left of FIG. 6, when the entire display unit 12 is switched to the mirror surface mode, information is not displayed. However, as shown in the right of FIG. 6, information can be displayed also in the mirror surface mode by the display controller 120 according to the embodiment such that AR (augmented reality) information 34 is displayed on the display unit 12 in the mirror surface mode.

For example, in the case of the display unit 12-2 shown in FIG. 3, the display controller 120 allows a group of pixels arranged in a region among all the pixels of the organic EL 125 to display information so that AR display shown in the right of FIG. 6 can be achieved. Further, in a case where the display unit 12 according to the embodiment is formed using an LCD and a semi-transmitting polarizing plate provided in front of the LCD, a part of the LCD may display information so that the AR display shown in the right of FIG. 6 can be achieved.

In the above manner, by performing the AR display in the display unit 12 in the mirror surface mode in which a mirror image of a real space is reflected, the communication terminal 1 is even more convenient. Therefore, for example, when input information is information for AR display, the display controller 120 may give priority to the mirror surface mode and switch the display unit 12 to the mirror surface mode, and then may display the AR information.

Next, the description returns to the step S109 in FIG. 4, and a case where it is determined that the mirror surface mode does not have priority (the display mode has priority) (S109/No) will be described. In this case, in step S115, the display controller 120 switches the display unit 12 to the display mode, and input information is displayed. Thus, when the default state is the display mode, that state is maintained, and when the default state is the mirror surface mode, the mirror surface mode is switched to the display mode.

For example, when the input information is an incoming call, the urgency is assumed to be high, so that the display controller 120 gives priority to information display (display mode) on the display unit 12 over the mirror surface mode. That is, as shown in FIG. 1, the display controller 120 forces the mirror surface mode to end to be switched to the display mode and allows the display unit 12 to display a screen which notifies the incoming call, thereby notifying the user about the incoming call.

The first display control processing according to the embodiment is specifically described above. In the following, second display control processing according to the embodiment will be described.

[3-2. Second Operation Processing]

In the above first display control processing, the description is made on the control of switching the modes of the display unit 12 to the mirror surface mode and the display mode in accordance with the type of input information. Here, even when the display unit 12 is switched to the mirror surface mode, in a dark environment, it might be difficult to look in the mirror. Thus, in the second display control processing according to the embodiment, a predetermined control is performed so that it can become easy to look in the mirror in the mirror surface mode even in a dark environment. Such a case will be specifically described below with reference to FIG. 7.

Figure 7:
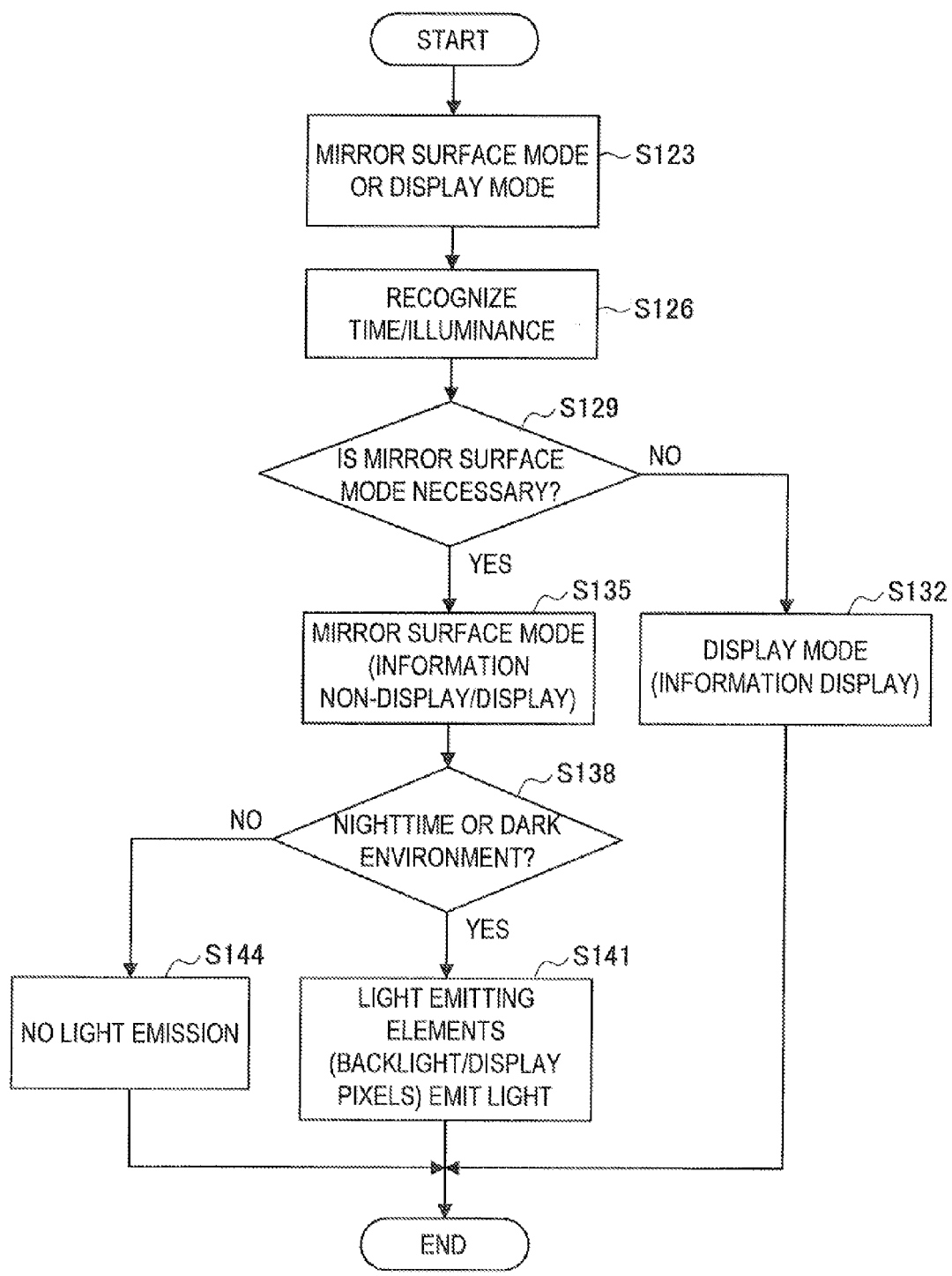
FIG. 7 is a flow chart showing second display control processing according to the embodiment.

FIG. 7 is a flow chart showing the second display control processing according to the embodiment. First, in step S123 in FIG. 7, the display unit 12 is switched to the mirror surface mode or the display mode. Specifically, the display unit 12 may be in the default state described in the step S103 above. Further, in the step S123, the processing in the steps S103 to S115 shown in FIG. 4 may be performed repeatedly.

Next, in step S126, the controller 10 recognizes the current time or the illuminance of ambient environment. Specifically, the display controller 120 can recognize the current time based on information output from the clock unit 15 or recognize the illuminance of ambient environment based on information output from the illuminance sensor 16.

Next, in step S129, the controller 10 determines whether or not the mirror surface mode is necessary. For example, when the user sets the mirror unnecessary, the controller 10 determines that the mirror surface mode is unnecessary. Further, when the display unit 12 is in the default state in the step S123, in the step S129, the processing in the steps S103 to S109 shown in FIG. 4 may be performed and it may be determined whether or not switching to the mirror surface mode is necessary in accordance with the type of input information.

Next, when switching to the mirror surface mode is unnecessary (S129/No), in step S132, the display controller 120 switches the display unit 12 to the display mode.

On the other hand, when switching to the mirror surface mode is necessary (S129/Yes), in step S135, the display controller 120 switches the display unit 12 to the mirror surface mode. In this case, the display controller 120 may switch the entire display unit 12 to the mirror surface mode; alternatively, as described above with reference to FIGS. 5 and 6, a part of the display unit 12 in the mirror surface mode may display information.

Next, in step S138, the display controller 120 determines whether or not the current time is predetermined nighttime or whether the illuminance is lower than the predetermined value based on information acquired in the step S126.

Next, when the current time is nighttime or the illuminance is lower than the predetermined value (S138/Yes), the ambient environment is dark and effects of a mirror surface function of the display unit 12 might be reduced; accordingly, the display controller 120 allows the light emitting elements in the display unit 12 to emit light in step S141. Here, the light emitting elements in the display unit 12 correspond to the backlight 123 in the case of the display unit 12-1 shown in FIG. 3 for example, or correspond to the organic EL 125 (display pixels) in the case of the display unit 12-2. The display controller 120 allows illumination with lighting of the backlight 123 or white light emission of the organic EL 125. Further, the backlight 123 or the organic EL 125 may be controlled by the display controller 120 to emit light with a predetermined light emission level (luminance) or higher.

Further, only light emitting elements (backlight 123 or organic EL 125) positioned at an end (edge) of the mirror surface portion (dimming mirror 121 or mirror surface filter 124) may be controlled by the display controller 120 to emit light.

In the above manner, as shown in FIG. 8 for example, in a case where the ambient environment is dark, when light is not emitted, effects of the mirror surface function of the display unit 12 are reduced (it is difficult to look in the mirror) as shown in the left of FIG. 8; on the other hand, when light is emitted, effects of the mirror surface function of the display unit 12 are increased (it is easy to look in the mirror) as shown in the right of FIG. 8.

On the other hand, when the current time is daytime or the illuminance is the predetermined value or higher (S138/No), it is assumed that the ambient environment is not dark, so that the display controller 120 does not allow the light emitting elements in the display unit 12 to emit light in the step S144.

The second display control processing is specifically described above. Note that although the display controller 120 determines whether or not light is to be emitted in accordance with the time or illuminance in the step S138, determination standards according to the embodiment are not limited to those, and for example, whether or not light is to be emitted may be determined in accordance with weather. For example, the display controller 120 may acquire weather information via the communication I/F 17, and when it is cloudy or rainy for example, it is assumed that the ambient environment is dark, so that light emission may be controlled. Further, the display controller 120 may acquire current location information of the communication terminal 1, and when the communication terminal is indoor, it is assumed that the ambient environment is dark, so that light emission may be controlled.

4. Conclusion

As described above, with the display control system according the embodiment, it is possible to determine the type of input information and to perform switching between the mirror surface mode and the display mode in accordance with determination results. Accordingly, the inconvenience is solved in the following manner: the mirror surface state is not forced to end when the power of the communication terminal is automatically turned on in a case of mail reception, an incoming call, an alarm time, or a time for television viewing reservation, when the user intends to continue using the mirror surface.

Further, when using an electro chromic material capable of being switched to the mirror surface state and the transparent state as a mirror surface material, switching of states might take time more or less. However, by setting the mirror surface mode as the default state of the display unit 12, the user can immediately use the display unit 12 as a mirror when necessary.

Further, in the embodiment, by allowing the light emitting elements of the display unit 12 to emit light in accordance with the current time or the illuminance of ambient environment, it is easy to look in the mirror of the display unit 12 even in a dark environment.

It should be understood by those skilled in the art that various modifications, combinations, sub-combinations and alterations may occur depending on design requirements and other factors insofar as they are within the scope of the appended claims or the equivalents thereof.

For example, the illuminance sensor 16 may be achieved by an imaging unit (camera module).

Further, the input information may be not only information of an incoming call or mail reception, but also information of operation or setting of a sleep mode, an energy saving mode, or the like. For example, when information of operation or setting of a sleep mode, an energy saving mode, or the like is input, the display controller 120 gives priority to the mirror surface mode and switches the display unit 12 to the mirror surface mode, so that power necessary for driving the liquid crystal panel 122 or the organic EL 125 can be reduced.

Further, the display controller 120 may acquire an image captured by an in-camera (not shown) provided in the communication terminal 1, in which the user gives a glance to the display unit 12 or blinks, and may detect the user's glance or blink based on the captured image as an instruction to switch the modes to the mirror surface mode. Specifically, in a state where the display unit 12 is switched to the display mode, when no information is displayed (for example, when the dimming mirror 121 is in the transparent state and the liquid crystal panel 122 is OFF), the display controller 120 may switch the modes to the mirror surface mode in accordance with the user's glance or blink. Thus, the user can switch the mode of the display unit 12 to the mirror surface mode by looking at the display unit 12 on which nothing is displayed or by blinking.

Additionally, the present technology may also be configured as below.

(1) A display control device including:
a determination unit configured to determine a type of input information; and
a display controller configured to switch modes of a display unit capable of being switched to a mirror surface mode and a display mode in accordance with a result of determination by the determination unit.

(2) The display control device according to (1), wherein the display controller controls light emission of a light emitting element which is not included in a mirror surface portion of the display unit in accordance with context when the display unit is in the mirror surface mode.

(3) The display control device according to (2),
wherein the context is a current time or an illuminance of ambient environment, and
wherein, when the current time is predetermined nighttime or when the illuminance of ambient environment is lower than a predetermined value, the display controller allows the light emitting element which is not included in the mirror surface portion of the display unit to emit light.

(4) The display control device according to (3),
wherein the light emitting element is a backlight, and
wherein the display controller allows the backlight to emit light with a predetermined light emission level or higher.

(5) The display control device according to (3),
wherein the light emitting element is an image element, and
wherein the display controller allows the image element to emit white light.

(6) The display control device according to any one of (1) to (5), wherein the display unit includes a material capable of switching states between a mirror surface state and a transparent state.

(7) The display control device according to (6), wherein the material is an electro chromic material.

(8) The display control device according to any one of (1) to (5), wherein the display unit includes a mirror surface filter formed of a metal evaporation film.

(9) The display control device according to any one of (1) to (5), wherein the display unit includes a half mirror.

(10) The display control device according to any one of (1) to (9), wherein, when the display unit is in the mirror surface mode, the display controller performs control such that a part of the display unit displays information.

(11) The display control device according to any one of (1) to (10), wherein, when the display unit is in the mirror surface mode and the type of input information gives priority to the display mode over the mirror surface mode, the display controller switches the modes of the display unit to the display mode.

(12) The display device according to any one of (1) to (11), wherein, when it is set that the mirror surface mode has priority over the display mode for a type of information determined by the determination unit, the display controller switches the modes of the display unit to the mirror surface mode.

(13) The display control device according to any one of (1) to (12), wherein the display unit displays the input information with any of a liquid crystal module, an organic EL, and an LED.

(14) A recording medium having a program stored therein, the program for causing a computer to function as:
a determination unit configured to determine a type of input information; and
a display controller configured to switch modes of a display unit capable of being switched to a mirror surface mode and a display mode in accordance with a result of determination by the determination unit.

What is claimed is:

1. A display control device comprising:
a determination unit configured to determine a type of input information to be displayed in a display mode on a display unit; and
a display controller configured to switch modes of the display unit between a mirror surface mode and the display mode in accordance with the type of the input information to be displayed in the display mode,
wherein the input information is not input by a user of the display control device, and wherein, in an event the display unit is in the mirror surface mode and the display controller determines that the type of the input information to be displayed gives priority to the mirror surface mode over the display mode, the display controller is configured to maintain the display unit in the mirror surface mode.

2. The display control device according to claim 1, wherein the display controller is configured to control light emission of a light emitting element which is not included in a mirror surface portion of the display unit in accordance with context in an event the display unit is in the mirror surface mode.

3. The display control device according to claim 2,
wherein the context is a current time or an illuminance of ambient environment, and
wherein, in an event the current time is predetermined nighttime or in an event the illuminance of the ambient environment is lower than a predetermined value, the display controller is configured to allow the light emitting element which is not included in the mirror surface portion of the display unit to emit light.

4. The display control device according to claim 2,
wherein the light emitting element is a backlight, and
wherein the display controller is configured to allow the backlight to emit light with a predetermined light emission level or higher.

5. The display control device according to claim 2,
wherein the light emitting element is an image element, and
wherein the display controller is configured to allow the image element to emit white light.

6. The display control device according to claim 1, wherein the display unit includes a material capable of switching states between a mirror surface state and a transparent state.

7. The display control device according to claim 6, wherein the material is an electrochromic material.

8. The display control device according to claim 1, wherein the display unit includes a mirror surface filter formed of a metal evaporation film.

9. The display control device according to claim 1, wherein the display unit includes a half mirror.

10. The display control device according to claim 1, wherein, in an event the display unit is in the mirror surface mode, the display controller is configured to perform control such that a part of the display unit is switched to the display mode to display information.

11. The display control device according to claim 1, wherein, in an event the display unit is in the mirror surface mode and the type of the input information gives priority to the display mode over the mirror surface mode, the display controller is configured to switch to the display mode of the display unit.

12. The display control device according to claim 1, wherein, in an event it is set that the mirror surface mode has priority over the display mode for the determined type of the input information, the display controller is configured to switch to the mirror surface mode of the display unit.

13. The display control device according to claim 1, wherein the display unit is configured to display the input information with any of a liquid crystal module, an organic electroluminescence (EL), and a light emitting diode (LED).

14. The display control device according to claim 1, wherein the display controller sets the mirror surface mode as a default state of the display unit, and in case information display in the display mode is finished, the display mode is automatically switched to the mirror surface mode.

15. A non-transitory computer-readable medium having stored thereon a set of a computer-executable instructions that when executed by a computer, causes the computer to perform steps comprising:
determining a type of input information to be displayed in a display mode on a display unit of a display control device; and
switching modes of the display unit between a mirror surface mode and the display mode in accordance with the type of the input information to be displayed in the display mode,
wherein the input information is not input by a user of the display control device, and
wherein, in an event the display unit is in the mirror surface mode and the type of the input information to be displayed is determined to dive priority to the mirror surface mode over the display mode, the mirror surface mode of the display unit is maintained.

* * * * *